Figure 1:
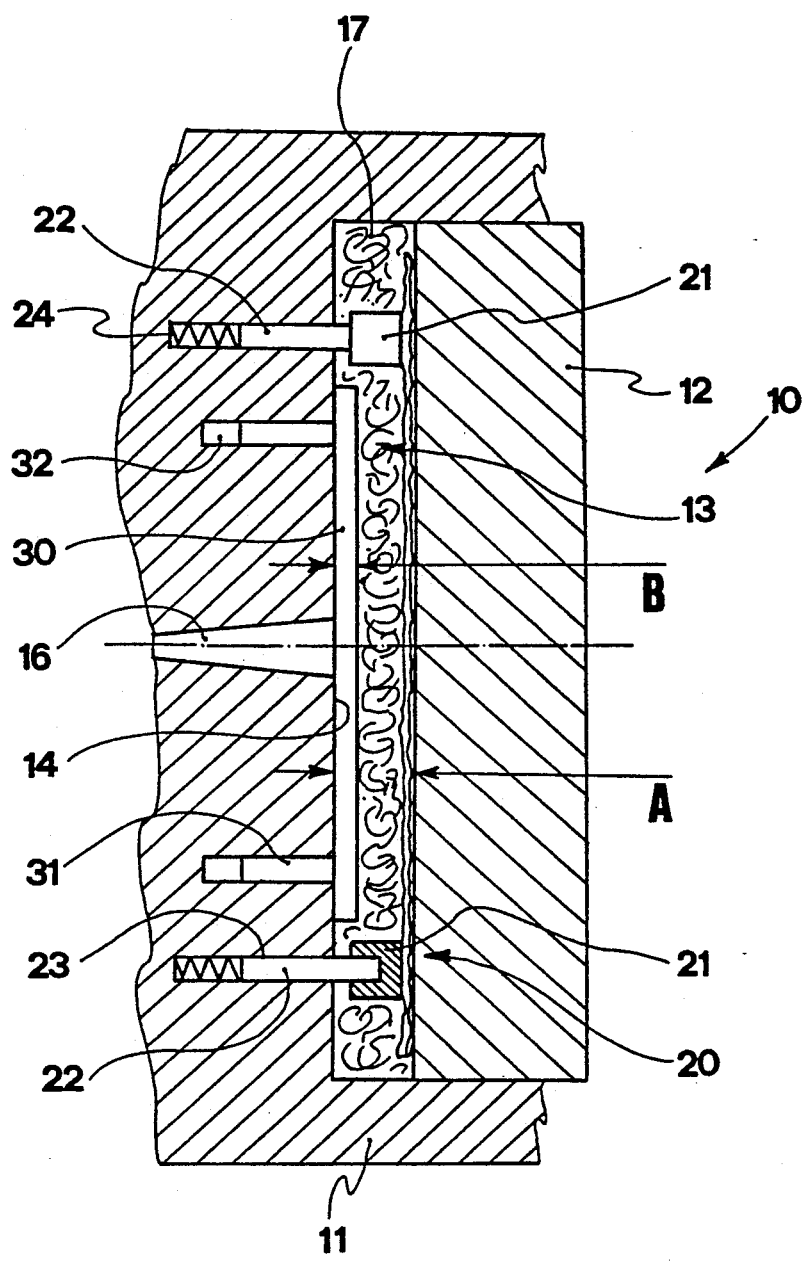

United States Patent [19]

Gagliani et al.

[11] Patent Number: 5,205,892

[45] Date of Patent: Apr. 27, 1993

[54] METHOD OF LINING PLASTIC OBJECTS WITH A THIN LAYER OF HEAT SENSITIVE MATERIAL

[76] Inventors: Giuseppe Gagliani; Margherita Sagona, both of 10126/2 Via Ugo La Malfa, I-90146 Palermo PA, Italy

[21] Appl. No.: 768,071

[22] PCT Filed: Jan. 20, 1991

[86] PCT No.: PCT/IT91/00005

§ 371 Date: Sep. 27, 1991

§ 102(e) Date: Sep. 27, 1991

[87] PCT Pub. No.: WO91/11326

PCT Pub. Date: Aug. 8, 1991

[30] Foreign Application Priority Data

Jan. 31, 1990 [IT] Italy .................... 19206 A/90

[51] Int. Cl.$^5$ ............... B29C 35/16; B29C 45/14; B29C 47/02; B29C 51/12

[52] U.S. Cl. ................. 156/212; 156/245; 156/285; 156/308.2; 156/324; 264/135; 264/136; 264/171; 264/257; 264/265; 264/510

[58] Field of Search ........... 156/155, 285, 245, 244.23, 156/212, 308.2, 324; 264/510, 511, 513, 515, 516, 135, 136, 257, 259, 265, 171; 425/506, 507

[56] References Cited

U.S. PATENT DOCUMENTS

| | | | |
|---|---|---|---|
| 3,893,882 | 7/1975 | Repenning | 264/516 |
| 4,051,214 | 9/1977 | Casper et al. | 264/136 |
| 4,106,745 | 8/1978 | Carrow | 249/97 |
| 4,289,559 | 9/1981 | Murphy | 156/238 |
| 4,418,031 | 11/1983 | Doerer et al. | 264/259 |
| 4,618,322 | 10/1986 | Lagasse | 425/129 R |
| 4,729,864 | 3/1988 | Chang et al. | 264/509 |
| 4,803,543 | 2/1989 | Inayoshi et al. | 156/330 |
| 4,806,185 | 2/1989 | Porter et al. | 264/46.6 |
| 4,824,506 | 4/1989 | Hoerner et al. | 156/285 |
| 4,873,041 | 10/1989 | Masui et al. | 264/136 |
| 4,925,723 | 5/1990 | Bujatti et al. | 156/155 |

FOREIGN PATENT DOCUMENTS

| | | |
|---|---|---|
| 0145523 | 10/1984 | European Pat. Off. . |
| 0150931 | 1/1985 | European Pat. Off. . |
| 0155552 | 2/1985 | European Pat. Off. . |
| 0281339 | 2/1988 | European Pat. Off. . |
| 0305969 | 8/1988 | European Pat. Off. . |
| 3612449 | 10/1987 | Fed. Rep. of Germany . |
| 60-262633 | 12/1985 | Japan .................... 264/516 |
| 2000717 | 1/1979 | United Kingdom . |

Primary Examiner—Jan H. Silbaugh
Assistant Examiner—Catherine Timm
Attorney, Agent, or Firm—Browdy and Neimark

[57] ABSTRACT

Process for unifying under heat thin structures (20) of synthetic material such as woven and non-woven fabrics, moquettes and other kinds, with manufactured products (13) made of plastic material, especially by means of well-known techniques such as molding, vacuum forming, thermoforming, calendering and others, the process consisting in the fact that the thin structure (20) is made heat-conducting by treatment with emulsions, pastes etcetera containing water, metals, heat-conducting products generally, and is made to adhere to a wall (17) of metal or of some other highly heat-conducting material, so that, during the unifying process the heat transferred from the plastic material forming the manufactured product (13) to the aforesaid thin structure (20) passes rapidly from the latter to the heat-conducting wall (17) thus preventing said structure (20) from becoming overheated and damaged.

9 Claims, 1 Drawing Sheet

METHOD OF LINING PLASTIC OBJECTS WITH A THIN LAYER OF HEAT SENSITIVE MATERIAL

The invention relates to a process for the manufacture of a product made of plastic materials.

It is known that the use of heat is impossible when uniting thin layers of synthetic material, such as woven and non-woven fabrics, moquettes and the like, with articles made of plastic material using the usual molding processes—especially injection molding—vacuum forming, thermoforming, extrusion, calendaring and others, since said thin layers tend to melt at high temperatures, and in any case they are damaged by the heat.

The limitations inherent in other methods of uniting are also well known.

Gluing is only possible when the product is responsive to solvents and glues, therefore excluding for example products made of polyolefins such as polypropylene, polyethylene and others.

The purpose of the above invention is to overcome these drawbacks as will be described below.

According to the invention the thin layers of synthetic material, such as woven and non-woven fabrics, moquettes and the like, are provided with heat-conducting properties and are made to adhere to a metal or in any case to a highly heat-conducting surface.

Consequently, during the operation of uniting the thin layer with a product made of plastic material, the heat transferred from said material to the thin layer rapidly passes through the latter and into the heat-conducting wall behind, thus preventing the thin layer from becoming so hot as to be damaged The aforesaid thin layer can be made heat-conductive by impregnation with a water-oil emulsion or some similar emulsion, or by application of pastes containing a high percentage of metal or, in any case, heat-conductive particles. During the uniting process the volatile parts evaporate, removing heat and leaving the product dry.

In the technique of molding plastic materials by means of dies, the aforesaid thin layer can be made to adhere to the moveable die by bushings and the like, which apply contact pressure against said thin layer and are kept in place by pins, sliding in holes made in the fixed die and pressed by springs.

The bushings are made of plastic material of substantially the same sort as the product to be molded, their length not exceeding the thickness of said product, so as to allow them to become spontaneously embedded in the mass of material during the molding process.

The above thin layer can be protected from the flow of injected plastic material by means of a screen placed in front of the injection port and supported by pins and the like sliding in holes made for them in the fixed die.

The dimensions of said screen must be substantially smaller than those of the product to be molded, and the material from which it is made must be the same as that of said product so that said screen can become spontaneously embedded in the mass of plastic material during molding In the vacuum forming technique the above thin layer is placed over the preformed sheet with which it is to be united, said sheet having been pre-heated, and is then pressed by counter dies against the lower die.

In the vacuum thermoforming technique using vertical molding machines said thin layer already united with a sheet is placed so as to face upwards, while the electric heating elements heating the forming die lie below the sheet to be thermoformed.

In extrusion, said thin layer is united with sheets of thermoplastics and similar material, when extrusion takes place.

Rollers are used to treat said thin layer with the heat-conducting emulsion or with another heat-conducting product.

By suitably adjusting the temperature of the extruded material and the pressure of the extruding rollers, the thickness of said thin layer to be left free can be determined at will.

In the thermoforming process said thin layer, already united with a sheet, is positioned so as to lie outside the product, facing downward and towards the female die, the male die being placed above.

In calendaring to unite said thin layer with a sheet of thermoplastic material, said layer is made to pass—together with the sheet of thermoplastic material under it—between cold rollers above and heated ones below.

If the synthetic material of which the thin layer is made, such as woven or non-woven fabric, moquettes and the like, or a part of said material, and if the plastic material of the product to which said thin layer is united by means of heat are of a suitable kind, said thin layer and said product are welded together in a continuous and stable manner by the heat.

In other cases heat unification takes place by mechanical gripping of elements forming the above thin layer, said elements being incorporated into the plastic material of the product during thermoforming, thus increasing the stability of unification.

Where the material of the above thin layer made of synthetic material requires, said layer is pre-treated with products that assist in embedding it, or some of the elements forming it, in the body of the product made of plastic material.

The advantages of the material are evident.

Not only is there the possibility of uniting thin layers made of synthetic material such as woven and non-woven fabrics, moquettes and the like with products of plastic material, even those unsuitable for receiving glues and the like, such as polyethylene, polypropylene and others, but also said union is extremely strong on account of the fact that said layer becomes partially embedded in the plastic material.

This union can be achieved without any trouble making use of practically all the known techniques, from injection molding to extrusion, from calendaring to thermoforming.

By means of this invention, types of application never possible before can now be effected quickly and efficiently, creating an innumerable quantity of new items, as well as giving great improvements in those already known and offering possibilities for important industrial and commercial development.

Figure 2:
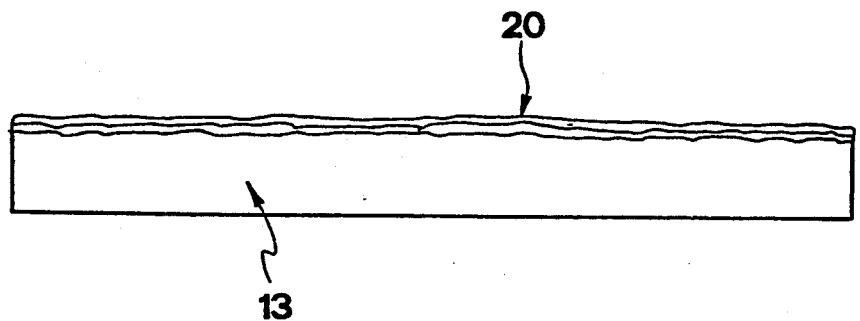

Characteristics and purposes of the invention will be made still clearer by the following example of embodiment, illustrated in the figures, in which:

FIG. 1 is a section view of an injection die for molding a sheet of polypropylene associated to a moquette-type fabric; and FIG. 2 shows the product when removed from the die after molding.

The die 10 is composed of a fixed part 11 and a mobile part 12.

The polypropylene is injected into the die through the injection port 14.

The piece of moquette 20 is adhered to the wall 17 of the metal mobile die 12 by means of bushings 21. Said bushings are supported by pins 22 free to translate in seats 23 in the fixed die 11 under pressure from cylindrical compression springs 24.

The length of the bushings 21 is less than the thickness A of the polypropylene sheet 13 to be formed.

Said bushings are made of the same material as said sheet.

The thin layer consisting of the moquette 20 has previously been impregnated with a water-oil emulsion to make it heat-conducting.

The injection port 14 is protected by a screen 30 consisting of a polypropylene disc with rear pegs 31 fitted into seats 32 made in the fixed die 11.

The thickness B of said disc is less than thickness A of the polyethylene product.

During molding the disc 30 becomes embedded in the polypropylene product 13, while the supporting pegs 31 are later removed together with the injection stem 16.

The heat passing from the thermoplastic material to the piece of moquette 20, due to the high degree of heat conductivity of said layer after impregnation with the water-oil emulsion, rapidly passes into the mass of the mobile die 12, to whose inner wall 17 said moquette 20 has been made to adhere.

As a result of this said moquette does not become hot enough to suffer damage.

This phenomenon is similar to that occurring when the lighted end of a cigarette is placed on a sheet of tissue paper adhering to a heat conducting surface.

Said surface absorbs the heat so rapidly that in spite of the temperature of 800° at the lighted end of the cigarette, the temperature of the tissue paper does not rise higher than about 60°.

When molding is completed, the bushings 21 and the disc 30 remain embedded in the sheet, forming a part thereof. The product thus obtained possesses all the best characteristics offered by a perfect union between a semi-rigid material such as polypropylene and a fabric structure such a moquette.

We claim:

1. A process for producing a product by uniting a permeable thin layer of low heat conductivity with a plastic material, comprising:
   impregnating said thin layer with a liquid or paste substance having good heat conducting properties;
   placing said impregnated thin layer adjacent to a heat conducting wall,
   contacting said impregnated thin layer with a molten plastic material so that said thin layer and said plastic material are stably united,
   passing heat from the molten plastic material to the thin layer, and
   rapidly passing said heat through said liquid or paste substance impregnated in said thin layer to the heat-conducting wall, a sufficient amount of heat being passed through said impregnated thin layer to said heat-conducting wall to prevent the thin layer from becoming so hot as to damage it.

2. The process as in claim 1 wherein the liquid or paste substance imparting heat-conducting properties is a water-oil emulsion which evaporates during the uniting process to remove heat.

3. The process as in claim 1, wherein the liquid or paste substance imparting heat-conducting properties is a paste of metal particles.

4. The process as in claim 1 wherein said product is obtained by calendaring the thin layer together with a sheet of thermoplastic material, to which it must be unified, said thermoplastic material being placed below said thin layer, between cold rollers above and hot rollers below.

5. The process as in claim 1, wherein said thin structure of material comprises moquettes or woven or non-woven material.

6. The process as in claim 1, wherein said product is obtained by injection molding of said plastic material in a closed mold wherein one side of said mold has a heat-conducting metal wall, comprising:
   adhering the thin layer to said heat-conducting metal wall of said one side of a mold, by means of bushings which apply contact pressure against said thin layer, said bushings being made of plastic material substantially the same as that of the molten plastic metal.

7. The process as in claim 6, further comprising:
   protecting the thin layer during injection of the molten plastic material into said mold, by placing a screen between an injection portion and the thin layer, the screen having dimensions smaller than those of said product, wherein said screen becomes embedded in the plastic material.

8. The process as in claim 6, further comprising holding said bushings in place with pins sliding in holes in a mold, said holes being filled with a spring which causes said pins to apply pressure on said bushings.

9. The process as in claim 1, wherein said product is obtained in a thermoforming machine, comprising;
   placing said impregnated thin layer on an upwardly facing surface of a cold metal forming die of said thermoforming machine;
   placing a preformed sheet of plastic material on a downwardly facing surface of a complementary forming die of said machine;
   heating said sheet of plastic material by electric heating elements to a temperature sufficient to unite said sheet of plastic material to said thin layer by thermoforming said sheet of plastic material and said thin layer; and,
   closing together said forming dies to unite said sheet of plastic material and said thin layer.

* * * * *